Roasting time shown parenthetically

Roasting temperature shown parenthetically

United States Patent Office

3,752,685
Patented Aug. 14, 1973

3,752,685
METHOD FOR PRODUCING HOLLOW GLASS MICRO-SPHERES AND THEIR COMPOSITES
Hidemasa Honda, Yukio Isayama, Kazuhiko Jinnai, and Kunio Kimura, Tosu, Japan, assignors to Agency of Industrial Science & Technology, Tokyo, Japan
Filed Mar. 2, 1971, Ser. No. 120,253
Claims priority, application Japan, Mar. 6, 1970, 45/18,722
Int. Cl. C08h 17/02; C09c; C09d
U.S. Cl. 106—288 B         8 Claims

ABSTRACT OF THE DISCLOSURE

When finely divided Shirasu (pumice ejected from volcanoes and the secondary deposit of such pumice) is roasted at a temperature in the range of from about 800° C., to about 1200° C., the vitreous particles contained in said Shirasu foam and consequently produce light-weight hollow glass micro-spheres. The hollow glass micro-spheres so produced are superior to conventional glass micro-spheres especially in their resistance to heat and can therefore be combined with metal, carbon, as well as with cement and other materials to produce novel light-weight composites.

---

This invention relates to a method for producing hollow glass micro-spheres and composites incorporating such micro-spheres.

Hollow glass micro-spheres are light in weight, highly resistant to chemicals, low in thermal conductivity and have an exceedingly low liquid absorption factor. They are, therefore, extensively used as a filler in plastic products, as an aggregate for reducing the weight of construction materials, as a sound arrester and as a thermal insulator.

Heretofore, hollow glass micro-spheres have been manufactured by combining sodium silicate and borax with a suitable foaming agent, drying the mixture, crushing it, adjusting the crushed particles in size and subsequently roasting the particles. However, because the starting materials are expensive and the process of production is complicated, the micro-spheres thus obtained tend to be high-priced. Moreover, the heretofore known micro-spheres melt about 300° C. and thus are limited in the number of their applications.

It is the principal object of this invention to provide a method for easily producing hollow glass micro-spheres of light weight and exceedingly low thermal conductivity from very cheap natural raw materials.

It is another object of the present invention to provide a method for producing composites formed by combining the micro-spheres so obtained with metal, carbon or cement.

The micro-spheres produced by the method of this invention have a far more heat resistant than the micro-spheres produced from sodium silicate and borax according to the conventional method. They do not melt when dispersed in molten aluminum, zinc, magnesium or similar metal or when mixed with the fine powder of aluminum, zinc, magnesium or other metal or alloy having a low melting point and heated in the mixed state. Thus, the micro-spheres of this invention make possible the production of new-type light-weight composites without difficulty.

Other objects and other characteristics of the present invention will become apparent from the description of this invention given hereinafter in further detail with reference to the accompanying drawing.

The inventors have found that when Shirasu, an abundantly occurring natural substance, is roasted for a short period of time at temperatures in the range of from about 800° C. to 1200° C., the vitreous particles contained in the said Shirasu foam and consequently produce hollow glass micro-spheres.

The term "Shirasu" as used in the present specification means massive, granular or powdery pumice ejected from volcanoes and the secondary deposit of such pumice.

For example, Shirasu produced in Kagoshima Prefecture of Japan is found to have the following mineral composition.

TABLE 1

|  | Percent |
|---|---|
| Volcanic glass | 70.26 |
| Feldspar and quartz | 27.73 |
| Magnetite and others | 2.01 |

Shirasu as a natural product occurs usually in a massive or granular form. It is pulverized by a suitable method to a particle size smaller than 250μ and then roasted at a temperature in the range of from about 800 to 1200° C. for a short time in a rotary kiln or the like. Consequently, the vitreous particles (volcanic glass) contained therein are softened by the heat and are foamed by the gas, moisture etc. contained therein, with the result that there are formed hollow glass micro-spheres about twice as large as the original particle.

For the purpose of roasting, the particle size of Shirasu is desirable smaller than 250μ. If the particle size exceeds 250μ, the micro-spheres formed in the roasting treatment do not have a sufficient degree of strength and the vitreous particles which undergo foaming remain in contact with the impure ingredients, making it difficult to obtain micro-spheres of pure glass. If the particle size is smaller than about 49μ, however, the vitreous particles break and tend to resist foaming. Even if foaming occurs, micro-spheres formed are small and are readily melted and fail to give a satisfactory yield.

When the roasting temperature is below 800° C., the vitreous particles in Shirasu are neither melted nor foamed. When it exceeds about 1200° C., micro-spheres which have been once formed again melt completely.

There is a close relationship between the roasting time and the roasting temperature just mentioned. At least about 10 minutes is required where the roasting is performed at temperatures around 800°. Less than 1 minute suffices where the roasting is carried out at higher temperatures approaching 1200° C.

Figure 1:
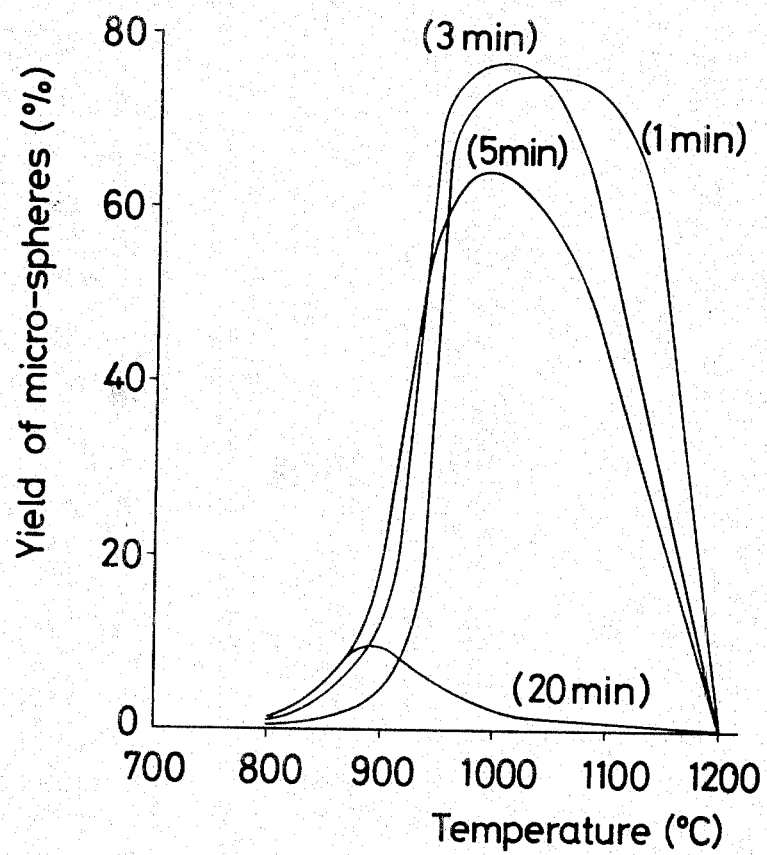
FIG. 1 is a graph illustrating the relation between the roasting temperature of Shirasu and the yield of micro-spheres.
Figure 2:
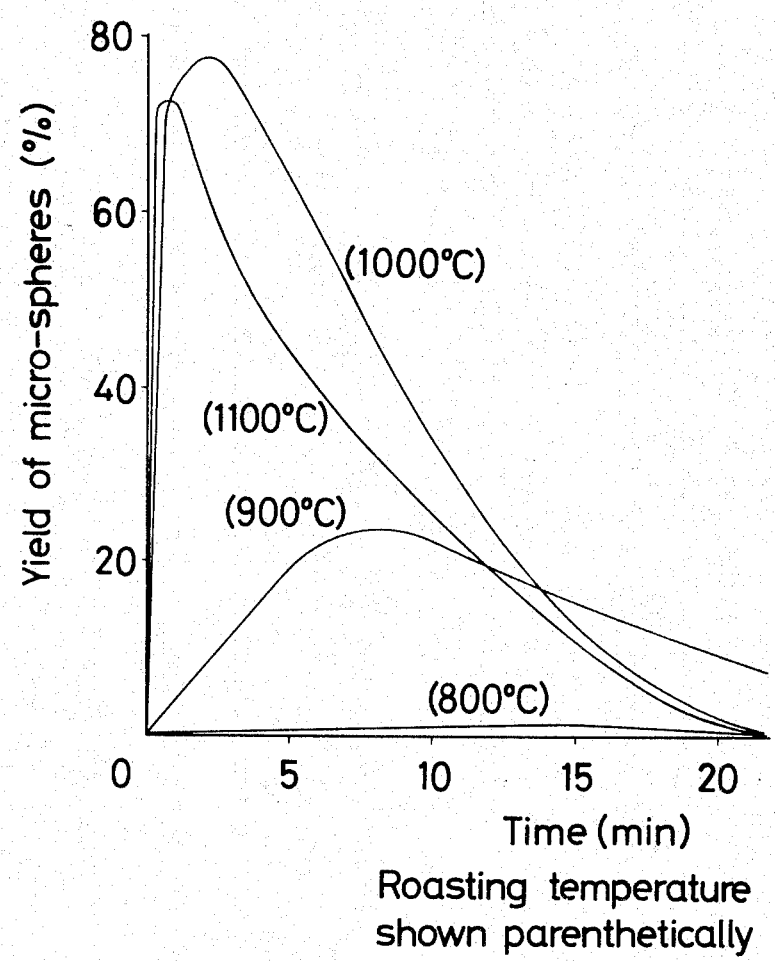
FIG. 2 is a graph illustrating the relation between the roasting time of Shirasu and the yield of micro-spheres.

The relationship between the roasting temperature and the roasting time is shown in FIG. 1 and FIG. 2. Shirasu used as the raw material in this case was found to have the particle size distribution shown in Table 2.

TABLE 2

| Particle size (μ) | Percentage composition | Vitreous particle content |
|---|---|---|
| 149–105 | About 22 percent | About 65 percent. |
| 105–74 | About 18 percent | About 75 percent. |
| 74–44 | About 20 percent | About 80 percent. |
| Below 44 | About 40 percent | About 90 percent. |

FIG. 1 shows that, when the vitreous particles present in the preceding raw material are separated and roasted for three minutes at about 1000° C., about 75% of the vitreous particles are foamed to produce micro-spheres. When they are roasted for one minute at about 1050° C., about 75% of them are foamed to produce micro-spheres. When the roasting is done at about 900° C., however, only about 10% of the vitreous particles are foamed to produce micro-spheres even if the roasting time is as long as 20 minutes.

FIG. 2 indicates that, when the roasting is performed at about 1100° C. for one minute, about 72% of the vitreous particles are converted into micro-spheres. When the roasting time is extended to five minutes at the same temperature, only about 42% of the vitreous particles are foamed. This decline is yield results because a proportion of the hollow glass micro-spheres formed at an early stage are melted down at a later stage in the course of heating.

If finely divided Shirasu particles are roasted as mingled with heavy sand, quartz, feldspar, hypersthenite or other crystalline mineral, slime or similar impure ingredients in, for example, a rotary kiln, only the vitreous particles are selectively foamed to produce micro-spheres. From the standpoint of thermal efficiency, however, it is preferable to separate the vitreous particles from the finely divided Shirasu particles and subject the separated particles alone to roasting.

One method available for the separation of vitreous particles makes use of the difference in specific gravity. Since the vitreous particles has a specific gravity of about 2.4 or less and unfoamable crystalline mineral ingredients such as quartz, feldspar and hypersthenite have specific gravities of 2.6 or greater, the former particles can easily be separated by means of such gravitational separators as jig and table separators or cyclones.

The Shirasu partcles which have undergone the aforementioned roasting treatment are cooled and subsequently dropped into a pool of water. The micro-spheres alone floats to the water surface and the unfoamed ingredients such as heavy sand, and slime settle to the bottom. As a consequence, nearly 100% pure hollow glass micro-spheres can be readily separated from the impure ingredients. It goes without saying that the separation can be accomplished not only by such classification in water but also by classification in the air.

The following table shows the particle size, and the specific gravity of the micro-spheres thus obtained.

TABLE 3

| Particle size (diameter), $\mu$ | 74–149 | 149–297 | 297–600 |
|---|---|---|---|
| Apparent specific gravity | 0.470 | 0.364 | 0.242 |
| Bulk density | 0.324 | 0.217 | 0.138 |

It is especially noteworthy that the micro-spheres obtained by the method of this invention are resistant to heat up to about 1000° C., a temperatures much higher than that for the conventional micro-spheres. When such micro-spheres are added as a light-weight aggregate to cement, there is obtained a cement-based light-weight composite having a specific gravity of 0.6–0.65 and a compression strength of 80–150 kg./cm.$^2$.

When these micro-spheres are dispersed in such metal as copper, aluminum, zinc or tin which has a melting point lower than that of the micro-spheres, there can be obtained a metal-based light-weight composite.

In producing this metal-based light-weight composite, the micro-spheres must be prevented from floating up to the surface of the molten metal. This is accomplished by first placing micro spheres in a mold having the shape of the desired product and employing a difference of pressure to draw the molten metal into the spaces between the micro-spheres without leaving any voids.

Otherwise, micro-spheres may be mixed with a powdered metal or alloy and, in that state, heated and fused in the mold.

The mixing ratio of micro-spheres to the metal can be adjusted suitably in accordance with the intended use to which the composite is put. In consideration of weight reduction and sufficient strength, the mixing ratio desirably exceeds 30%. However, the composite is too greatly deprived of its strength when the mixing ratio exceeds 80%.

The metal-based light-weight composite thus produced is slightly inferior in lightness to the conventional porous metal product but has a phenomenally higher strength. Therefore, this composite finds extensive uses as an intermediary material between the porous metal product and the metal material, in the construction of buildings and aircraft, for example.

Light-weight carbon products are obtained from the micro-spheres produced by the method of this invention when the micro-spheres are added to a binder such as coal tar, coal tar pitch, petroleum pitch, asphalt or other pitch, or such as phenol resin, furan resin, acrylonitrile resin, or other thermosetting resin, or to such a filler as coal, coke, carbon, graphite and carbon black or to combinations of these substances in the form of a mixture, then molded to a desired form under pressure of a degree not so high as to break the micro-spheres and thereafter roasted in a nonoxidizing atmosphere such as nitrogen atmosphere to carbonize the mixture.

The carbon-based light-weight composite thus obtained is much lighter than the ordinary carbon products; it has a bulk density of 1.0 g./cm.$^3$ or less compared with about 1.5 g./cm.$^3$ for the ordinary carbon products. This composite has a heat-resistance up to about 1300–1500° C. and particularly excels in resistance to heat shock. For example, a composite made by using coal tar pitch as the binder was not affected at all when it was heated to 1000° C. and immediately thrown into cold water. The electric resistance of a resultant composite can be adjusted freely by suitably incorporating carbon or graphite as a filler.

As has been stated, the micro-spheres produced by the method of this invention use natural resources as the starting materials and, therefore, can be marketed at a very low price compared with the conventional micro-spheres. Since they further offer decidedly better properties including outstanding heat resistance, they find a rich variety of uses not possible for the conventional micro-spheres.

The following examples are further illustrative of this invention, and it will be understood that the present invention is not limited thereto.

EXAMPLE 1

500 g. of Shirasu having the mineral composition shown in Table 4 was pulverized finely to a particle size of less than 150$\mu$ and roasted in a rotary kiln at about 1000° C. for two minutes. When the roasted particles were immediately dropped into water, about 350 g. of micro-spheres floated to the water surface. The micro-spheres collected from the water had an approximate particle diameter of 200$\mu$.

TABLE 4

| | Percent |
|---|---|
| Volcanic glass | 72.6 |
| Feldspar and quartz | 25.3 |
| Magnetite and others | 2.1 |

EXAMPLE 2

100 g. Shirasu having the mineral composition shown in Table 5 was separated into the component ingredients, which were roasted separately at about 1100° C. for two minutes.

TABLE 5

| Ingredient | Weight (g.) | Yield of micro-spheres (percent) |
|---|---|---|
| Heavy sand | 5 | 15.55 |
| Light sand | 5 | 25.44 |
| Slime | 2 | 22.92 |
| Vitreous particles | 78 | 87.08 |

The above table shows that small amounts of vitreous particles were adhering to heavy sand, light sand and slime and that these particles foamed to produce micro-spheres.

EXAMPLE 3

Shirasu was finely pulverized to grain sizes less than 150μ and was separated by grain size into the groups as in Table 6. These separated portions were roasted independently at about 1100° C. for two minutes.

TABLE 6

| Grain size (μ) | Specific gravity | Percentage composition (percent) | Yield of micro-spheres (percent) |
| --- | --- | --- | --- |
| 149–105 | 2.4 minimum | 7.7 | 9.73 |
| 149–105 | 2.4 maximum | 14.3 | 78.46 |
| 105–74 | 2.4 minimum | 9.0 | 16.38 |
| 105–74 | 2.4 maximum | 9.0 | 90.95 |
| 74–44 | 2.4 minimum | 13.0 | 21.71 |
| 74–44 | 2.4 maximum | 7.0 | 50.66 |
| 44 maximum | 2.4 minimum | 30.0 | 0.82 |
| Do | 2.4 maximum | 10.0 | 15.00 |

The above table clearly indicates that the portions having specific gravities not exceeding 2.4 contained vitreous particles richly and enjoyed higher foaming ratios than the portions having specific gravities exceeding 2.4. It is also shown that, in the portions having grain sizes not exceeding 50μ, the vitreous particles were broken and could not induce effective foaming.

EXAMPLE 4

A graphite-made mold measuring 50 mm. in inside diameter and 200 mm. in height was fitted at its upper portion with a vacuum pipe for discharging exhaust gas and at the base portion with charging mouth. This mold was filled with micro-spheres 300–590μ in grain size prepared by following the procedure of Example 1. Then, pure aluminum melted at 760° C. was forced into the remaining space of the mold while the mold interior was held under reduced pressure.

The aluminum-based composite thus obtained was found to have a specific gravity of 1.36, a tensile strength of 1.52 g., an elongation of 0.5% and a compression strength of 4.2 kg./mm.$^2$.

EXAMPLE 5

30 g. of coal tar pitch (softening point: 95° C.) was mixed at a temperature of about 150° C. with 70 g. of micro-spheres (particle size on the average: 200μ) produced in accordance with the procedure of Example 1. The resultant mixture was put into a mold, preheated to 120° C., where it was molded under a pressure of 15.5 kg./cm.$^2$. The product so molded was heated to 500° C. at a heating rate of 3° C. per minute and thereafter maintained at 500° C. for one hour. The product was further roasted at 1000° C. at a heating rate of 6° C. per minute. The composite thus obtained was found to have a bulk density of 0.72 g./cm.$^3$ and a compression strength of 133 kg./cm.$^2$.

The following Table 7 shows the bulk densities and compression strengths of the composites which have been obtained in the same manner as mentioned above but with different mixing ratios of pitch and micro-spheres.

TABLE 7

| Amount of pitch (g.) | Amount of micro-spheres (g.) | Bulk density (g./cm.$^3$) | Compression strength (kg./cm.$^2$) |
| --- | --- | --- | --- |
| 20 | 80 | 0.61 | 155.0 |
| 30 | 70 | 0.72 | 133.0 |
| 40 | 60 | 0.75 | 130.0 |

EXAMPLE 6

The mixture comprising 80 g. of phenol resin (Novolak type) and 20 g. of micro-spheres (particle size on the average: 200μ) was put into a mold where it was formed by heating a temperature of 80° C. for 24 hours. As a result of roasting it in the same manner as mentioned in Example 5, the composite thus obtained was found to have a bulk density of 0.45 g./cm.$^3$ and a compression strength of 4 kg./cm.$^2$ and to be porous.

What is claimed is:

1. A method for producing pumice hollow glass micro-spheres which comprises, roasting for 1 minute to 20 minutes at a temperature in the range from about 800° C. to 1200° C., finely divided natural pumice ejected from volcanoes and the secondary deposit of such pumice, said pumice having a grain size from about 49μ to 250μ; thereby causing vitreous particles in said pumice to undergo sufficient foaming to form pumice hollow glass micro-spheres; and recovering the hollow glass micro-spheres having a particle size diameter of 74–600μ, an apparent specific gravity of greater than 0.242 and less than 0.470, and a bulk density of greater than 0.138 and less than 0.324, wherein particle size diameters in the range of 74–149μ have an apparent specific gravity of 0.470 and a bulk density of 0.324, particle size diameters in the range of 149–297μ have an apparent specific gravity of 0.364 and a bulk density of 0.217, and particle size diameters in the range of 297–600μ have an apparent specific gravity of 0.242 and a bulk density of 0.138.

2. The method of claim 1 wherein roasting is for three minutes at about 1000° C.

3. The method of claim 1, wherein roasting is for one minute to five minutes at about 1050° C. to 1100° C.

4. The method of claim 1 wherein separation of roasted particles is by means of gravitational separators.

5. The method of claim 4 wherein separation is by dropping roasted particles into a pool of water.

6. The method of claim 4 wherein the recovered particles have a particle size of 74–149μ and an apparent specific gravity of 0.470.

7. The method of claim 4 wherein the recovered particles have a particle size of 149–297μ and an apparent specific gravity of 0.364.

8. The method of claim 4 wherein the recovered particles have a particle size of 297–600μ and an apparent specific gravity of 0.242.

References Cited

UNITED STATES PATENTS

| | | | |
| --- | --- | --- | --- |
| 2,676,892 | 4/1954 | McLaughlin | 106—40 X |
| 2,935,412 | 5/1960 | Gzemski et al. | 106—280 X |
| 2,978,340 | 4/1961 | Veatch et al. | 106—40 |
| 3,063,856 | 11/1962 | Hardman et al. | 106—281 |

JOAN B. EVANS, Primary Examiner

U.S. Cl. X.R.

106—280, 281, Pumice Digest